United States Patent [19]

Rae

[11] 4,221,288
[45] Sep. 9, 1980

[54] CONVEYOR ROLLER

[75] Inventor: George Rae, Port Hope, Canada

[73] Assignee: Rexnord Inc., Milwaukee, Wis.

[21] Appl. No.: 973,319

[22] Filed: Dec. 26, 1978

[51] Int. Cl.² .............................................. B65G 13/06
[52] U.S. Cl. ..................................... 198/781; 198/789
[58] Field of Search ............... 198/781, 789, 790, 791; 64/30 E

[56] References Cited
U.S. PATENT DOCUMENTS

| | | | |
|---|---|---|---|
| 2,609,917 | 9/1952 | Gotthardt | 198/789 |
| 4,006,815 | 2/1977 | Werntz | 198/781 |
| 4,013,161 | 3/1977 | Nelson | 198/781 |
| 4,096,942 | 6/1978 | Shepherd | 198/781 |

Primary Examiner—Jeffrey V. Nase

Attorney, Agent, or Firm—Aaron L. Hardt; Vance A. Smith

[57] ABSTRACT

A roller of the slip-type is comprised of a sleeve with an insert press fitted therein. The other end of the insert houses a bearing assembly, the inner and outer race of which are respectively keyed to a stationary support axle and to the insert. A driven element is loosely mounted about the insert but is pressed against the insert by a belt under tension which also engages one or more driven elements of adjacent rollers. The driven element is driven by an endless driving devices. When a counter-torque is experienced by the roller due to an impediment which is greater than the driving torque, slippage will occur between the driven element and the insert, and the article being carried by the conveyor will come to rest.

7 Claims, 4 Drawing Figures

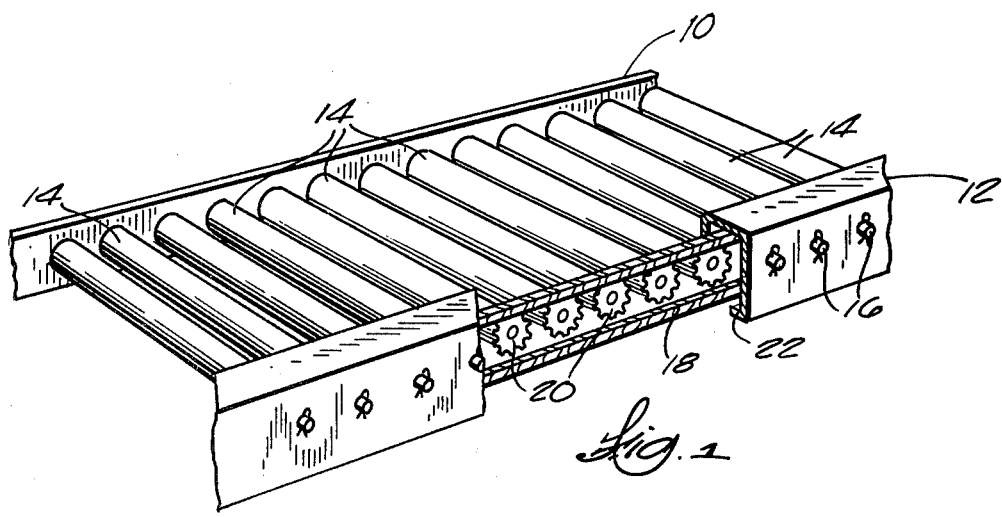
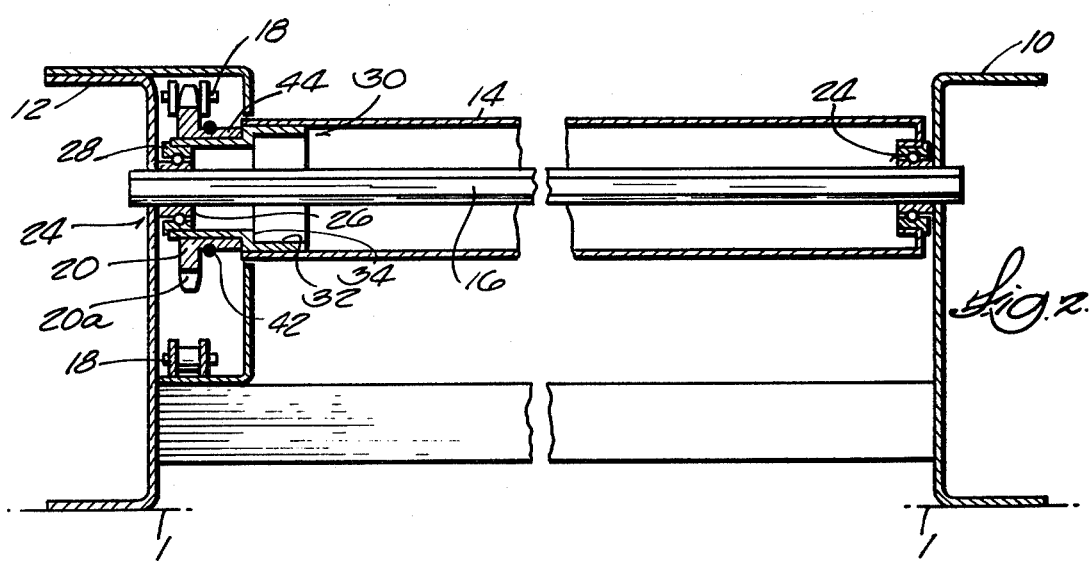
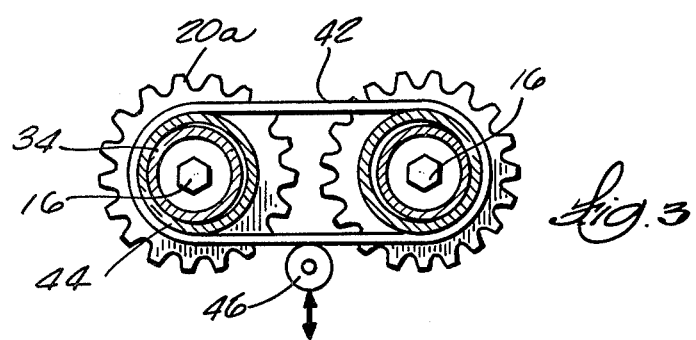

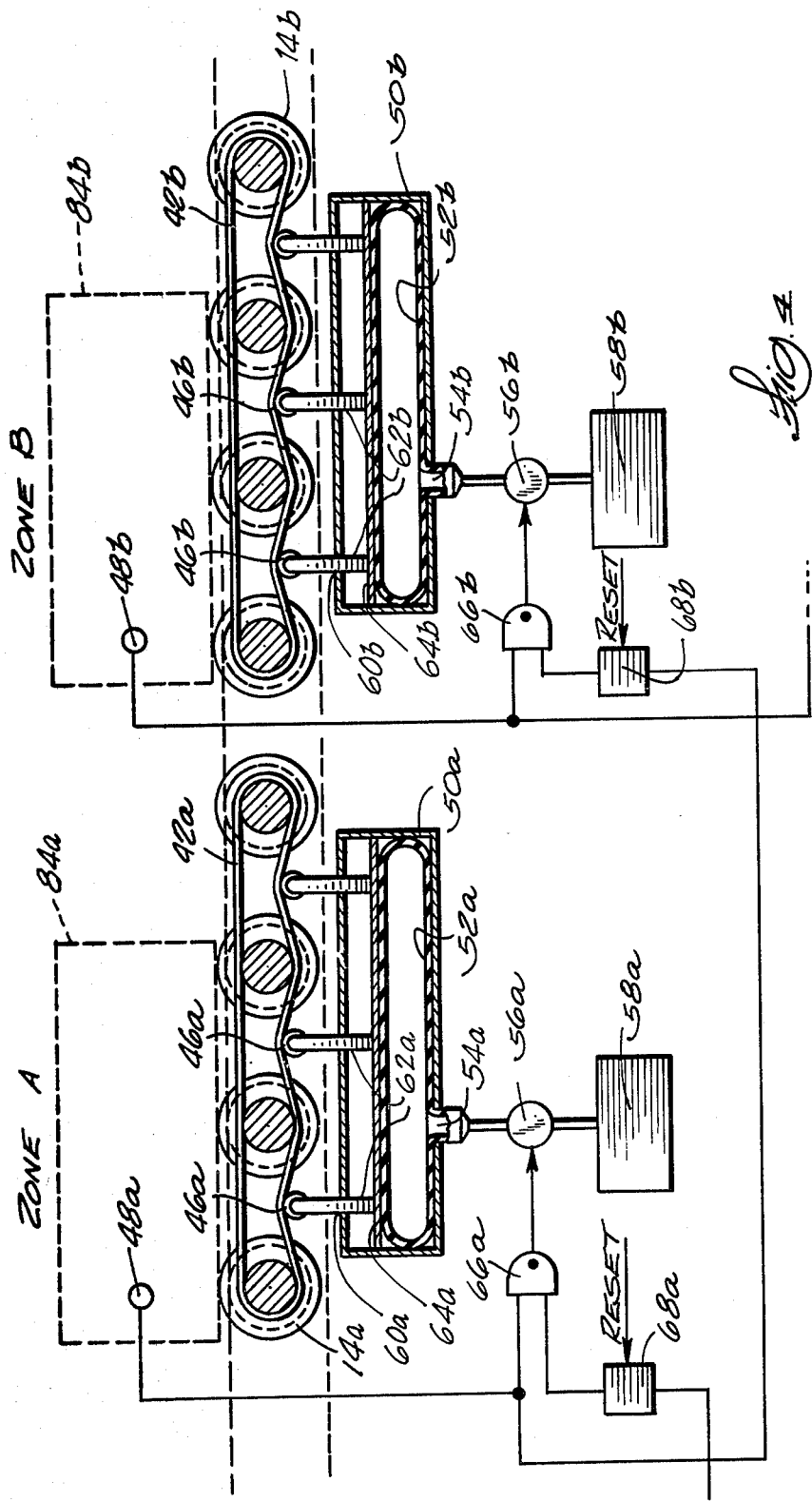

CONVEYOR ROLLER

BACKGROUND OF THE INVENTION

(1) Field of the Invention

This invention relates to a slip roller for use in powered roller conveyors and more particularly to an improved slip roller which provides an accumulating function to a powered roller conveyor assembly.

(2) Description of the Prior Art

There are a number of slip type rollers which are described in the patent literature. Examples may be found in U.S. Pat. Nos. 4,006,815, 4,096,942 and 2,976,981. Additionally, co-pending application Ser. No. 912,676, assigned to the same assignee as the instant invention, describes a slip-type roller. U.S. Pat. Nos. 2,976,981 and 4,006,815 and application Ser. No. 912,676 have slipping characteristics which occur when the "counter-torque" (caused by an impediment to further movement of articles carried by the conveyor) becomes greater than the driving torque of the roller. Actual slippage occurs between the roller sleeve and a hub member contacting the sleeve. This prevents damage to the articles due to the pressure which otherwise would result from the driving torque. A disadvantage to this type of slip-roller assembly may occur with heavy loads. The frictional force between sleeve and hub becomes greater with increasing loads, thus increasing the driving torque. Slippage will occur with heavy loads only with greater counter-torque. This may be a serious problem, particularly with fragile but heavy articles since the pressures on the articles caused by their weight may be directly responsible for damage.

A variation of the slip-roller is described in U.S. Pat. No. 4,096,942. The drive which is an endless drive means engages a slip collar about a roller. The roller itself is supported for rotation by means independent of the slip collar. Thus, the slip collar is not affected by increasing loads and the driving torque remains essentially constant. There is, however, relative movement between the roller sleeve and slip collar which inevitably results in some wear to the sleeve.

It is, therefore, a paramount object of the present invention to provide for an improved slip-type roller which provides a constant driving torque to articles being carried by a powered roller conveyor assembly.

It is another important object of the present invention to provide a slip-type function to a roller without concurrent wear to the roller itself.

Still another important object of the present invention is to provide an improved slip-type roller which permits a conveyor assembly to have zones for accumulating articles.

SUMMARY OF THE INVENTION

Each roller of the improved apparatus is supported at one end in a manner similar to conventional rollers of the prior art. That is, conventional rollers are in the form of a cylindrical sleeve. A hub bearing assembly is housed within the sleeve and caps one end thereof, providing rotational support at that point to the sleeve about a stationary axle. Disposed at the other end are various elements which collectively provide an accumulating function to the conveyor. First, a cylindrical shaped insert has a portion press fitted within the sleeve. A second portion of the insert extends away from the sleeve and encloses a bearing assembly, the outer race of which is in a press fit relationship with the internal diameter. The inner race of the bearing assembly is keyed to be supported by an axle extending between a pair of side rails. The sleeve, insert, and outer race of the bearing assembly all rotate together. Mounted on the second portion of each insert is a driven element engaging an endless driving means. The driven element has an inner diameter slightly larger than the outer diameter of the second portion. Additionally, a plurality of belts, each under a predetermined tension, engage selected pairs of driven elements at a postion adjacent the positions of engagement of said driving means. The belts, being under tension, produce reactionary or normal forces between the surfaces of the driven elements and insets.

In ordinary situations, the rollers of the assembly carry various loads along the surface of the assembly. Each roller is rotated by an endless driving means engaging each driven element. The frictional or driving force between surfaces of each element and its insert caused by the tension belt engaging paired driven elements is sufficient to transmit rotation to the insert, bearing assembly, and sleeve. As the various loads encounter one another at a point on the assembly, stoppage occurs and line pressure begins to build, causing a countervailing torque to act upon each roller. When the countervailing torque reaches a level equal to or greater than the torque of the roller imposed by the driving force on the rollers, i.e. the driving torque, the paired rollers will cease to rotate. This occurs irrespective of the total weight of the load. In other words, the frictional force between the driven element and insert is independent of the load on the rollers.

BRIEF DESCRIPTION OF THE DRAWINGS

FIG. 1 is a perspective of a roller conveyor assembly, partially broken away along the chain guard.

FIG. 2 is a side-sectional view of a single roller and its slip mechanism.

FIG. 3 is an end view of the slip mechanism.

FIG. 4 is a schematic of a roller conveyor system employing the present invention.

DETAILED DESCRIPTION OF THE PREFERRED EMBODIMENT

The roller conveyor apparatus of FIG. 1 is comprised of three major parts: a frame structure consisting of two parallel rails 10, 12; a plurality of rollers 14 mounted on axles 16 supported by rails 10, 12; and a roller drive which is here illustrated as sprockets 20 and chain 18. It should be understood that other drives may be used also such as pulleys and v-shaped drive belts. The power may be supplied by any motor (not shown) typically used to drive chain or other endless driving devices.

Rollers 14 and axles 16 are generally positioned horizontally between rails 10, 12 with rollers 14 providing a conveyig surface to articles placed on the rollers. To prevent materials from contacting sprockets 20 and chain 18, both are positioned within a safety enclosure 22. Enclosure 22 serves both as a safety guard and lateral guide for articles being moved along the conveyor. As graphically illustrated in FIG. 2 by conventional drawing symbol 1, rails 10 and 12 can be mounted on any conventinal support for roller conveyor apparatus.

Each roller 14 is an elongated cylinder, usually made of metal sheet material. As seen in FIG. 2, the right end of roller 14 houses a typical bearing assembly 24 mounted on axle 16. The inner race 26 of such as assembly is typically secured or keyed to axle 16 while the outer race is keyed to roller 14. Axle 16 which may be of hexagonal cross-section is held stationary in this instance by rails 10, 12. Thus, inner race 26 of the assembly 24 is also held stationary while outer race 28 and roller 14 are free to rotate about axle 16.

Viewing the left end of roller 14, an insert 30, in general cylindrical form, has a portion 32 with a diameter slightly greater than the internal diameter of roller 14 press fitted into roller 14. Extension 34 of insert 30 with a reduced diameter extends about the bearing assembly 24 and is keyed to outer race 28. The keying may be accomplished in a number of ways, but in this instance is obtained through a press fit relationship between the inner diameter of extension 34 and outer race 28. Inner race 26 is keyed to axles 16 by virtue of the hexagonal shape of axles 16. Sprocket 20 is journaled about the extended portion and is shown being engaged by chain 18 along teeth 20a. A belt 42 is shown engaging the extended barrel 44 of sprocket 20 near the base of teeth 20a.

As best seen in the side sectional view of FIG. 3, depicting two adjacent slip sprocket assemblies, the inner diameter of barrels 44 are slightly larger than the outer diameter of insert extensions 34. Belt 42 engages both barrels and is under a predetermined tension which can be set through appropriate selection of a belt or which can be adjusted through up or down movement of adjustable snub roller 46.

Belt 42, being under tension, pulls adjacent sprockets 20 toward one another as depicted by the gaps appearing between the inner surfaces of barrel 44 and outer surface of insert extension 34. The dimensions of the gap are exaggerated for purposes of explanation.

It should be noted that the force exerted by sprocket 20 on extension 34 is independent of the load on roller 14. It is, however, directly proportional to the tensional force exerted by belt 42. Thus, the greater the tensional force, the greater the force exerted by sprocket 20 on extension 34. Under normal conditions, the rotative force of sprocket 20 being pressed by belt 42 against extension 34 is sufficient to transmit the continuous rotation of sprocket 20 to roller 14.

When the articles carried by rollers 14 encounter resistance to forward movement, it is desirable to stop the rotation of the rollers to prevent damaging the articles. The line force exerted on the stopped lead articles from articles collecting toward the rear rapidly mounts unless the conveyor assembly is of the accumulator type such as the invention described herein. When the resistance to the forward movement of the articles reaches a predetermined level, rollers 14 supporting the article will cease to rotate. This occurs as the counter-torque on the surface of roller 14 caused by the increasing resistance against forward motion equals the driving torque generated by sprocket 20. Since the force needed to turn extension 34 is now greater than $\mu T$ where $\mu$ is the coefficient of sliding friction between sprocket 20 and extension 34 and T is the force exerted by belt 42, sprocket 20 slides across the surface of extension 34. Roller 14 then ceaes to rotate.

The importance of the independence of the sprocket force of load now becomes apparent. Increasing the weight of the articles, i.e., the load as would be experienced in ordinary material handling situations has little affect since the rolling coefficient of friction in the bearing assembly is so small. Sprocket 20 easily rotates roller 14, outer race 28, and extension 34. Slippage then occurs only in response to the resistance encountered by the movement of articles.

The ability to vary the tension of belt 42 is extremely important since it may be desirable to accomodate various levels of load resistance. For fragile articles, the tension of belts 42 would ordinarily be less so that slippage occurs for small counter-torques. The converse would be true where gentle line pressure is not as important. Different tension settings for various regions of the conveyor assembly may also be desirable in some situations. For example, to offset gravitatinal counter-torques generated by moving articles up or down an incline, one needs to change the tension of the belt in such a region.

The present invention is readily adaptable to the automatic zoning of conveyor assemblies. Automatic zoning is extremely advantageous in that line pressure build up is avoided almost completely. Most slip drive arrangements do not eliminate but merely minimize line pressure. For example, in the instant invenion, line pressure exerted on an article stopped due to an obstacle is proportional to the sum of the forces exerted by all upstream articles pressing against the stopped article. Even where the individual force is small, the total can be large. Automatic zoning, however, permits reduction of the upstream forces whenever an article stops or articles become a certain minimum distance apart.

The schematic of FIG. 4 illustrates such an automatic zoning device. For descriptive purposes, only two zones depicted as A and B, respectively, are shown. All elements are duplicated in each zone for clarity and denote their proper zones by "a" or "b" following the character numbers. An actual assembly would have a plurality of zones in which a blocking event at a downstream zone would cause the rollers of upstream zones perhaps several zones away to cease rotation. For the sake of clarity, however, FIG. 4 depicts an event in zone A which affects zone B.

Photoelectric cell 48a is positioned above rollers 14 for detecting the presence of articles 84a such as shown in dashed lines. Snubbing rollers 46a are shown engaging belt 42a and applyig tension thereto. Positioned beneath rollers 46a is a channel 50a enclosing an inflatable tube 52a having an inlet 54a, which is connected to a source of fluid pressure 56a via electromechanical valve 58a. Channel 50a is provied with a plurality of cylindrical openings 60a which receive piston member 62a which engages a plate 64a resting on inflatable tube 52a. Piston member 62a has bifurcated upper portions which support axles of the snub rollers 46a.

In operation, if the path of light to photoelectric cell 48a is blocked by an article 84a as shown in dashed lines in FIG. 4, a signal generated by cell 48a is sent to AND gate 66a and time delay relay 68b. Relay 68b may have a delay time of any predetermined amount but is generally set for a period of time sufficient in ordinary circumstances for an article to completely pass through the light path focussed upon cell 48a. When set, relay 68b provides a signal directly to AND gate 66b. If at the same time another article is also blocking cell 48b, a second signal goes to AND gate 66b which signals valve 58b to open and vent the pressurized fluid to the atmosphere. Tube 52b deflates, lowering snub rollers 46b and thereby permitting belt 42b to slide freely over sprocket extension 44. Any articles being carried by rollers 14a in zone B would immediately stop, preventing line pressure buildup. It should be noted that valve 58b operates only when both cells 48a and 48b are blocked. When only cell 48a is blocked, the rollers in zone B will continue to rotate. Whether this function is performed, however, depends on the need of the operator.

Once the article clears cell 48a, both relay 68b and valve 58b are rest. The latter in its reset mode permits fluid under pressure to flow back into tube 52b, forcing snub rollers 46b again to contact belt 42b. Rollers 14b in zone B again being coupled to driving chain 18 start to rotate and the belt moves.

It should be understood that the sensing means embodied herein as cell 48a could be employed to control rollers of zones several groups removed from zone A if desired. Similarly, various other mechanical and electro-mechanical means could be employed to vary the tension of belts 42.

The foregoing is believed sufficient for those skilled in the art to understand the invention. Modifications and variations will be readily apparent in light of this disclosure. The actual inventive scope, however, is defined by the following claims.

I claim

1. An accumulating roller conveyor having a support, a pair of side frames mounted on said support, a multiplicity of axles fixedly mounted between said side frames, a multiplicity of rollers rotatably mounted on said axles and defining surfaces over which articles are transported, cylindrically shaped inserts having a first portion thereof press-fitted into one end of each roller, a plurality of driven elements positioned about a second portion of said inserts and spaced from said one roller end, the inner diameter of said driven elements being slightly greater than the outer diameter of said second portion, a drive means engaging and driving said driven means, and means engaging selected driven elements adjacent the positions of engagement by said driving means to produce reactionary forces between the surfaces of the selected driven elements and inserts, whereby as each selected driven element rotates, the resultant forces between the surfaces of the selected driven elements and corresponding inserts impose a driving force on the rollers which will continue to rotate until a counter-vailing torque acts upon the roller which is equal to or greater than the torque imposed by the driving force.

2. The conveyor of claim 1 in which said engaging means is at least one belt under predetermined tension.

3. The conveyor of claim 2 including several tension belts and means to vary the tension of at least some of said belts.

4. The conveyor of claim 3 including a means for sensing the presence of articles passing over a roller and for changing the tension of selected belts in response thereto.

5. A system for accumulating articles in a roller conveyor assembly including
   (a) a roller conveyor apparatus which comprises
      (1) a plurality of rollers rotatably mounted on stationary axles supported by a pair of side frames,
      (2) cylindrically shaped inserts keyed to one end of each of said rollers,
      (3) driven elements slideably engaging said inserts,
      (4) first engaging means for pressing the driven elements located in a first zonal region of said conveyor against its associated inserts,
      (5) second engaging means for pressing the driven elements located in a second zonal region of aid conveyor against its associated inserts, and
      (6) driving means in contact with the driven elements in first and second zonal regions; and
   (b) control means including
      (1) first article sensing means for generating a first signal when an article carried by said rollers is located in said first zonal region,
      (2) a second article sensing means for generating a second signal when an article carried by said rollers is located in said second zonal region, and
      (3) tension varying means in contact with said second engaging means for reducing the pressing force exerted against its associated inserts in response to the presence of said first and second signals, thereby allowing accumulation of articles in the second zonal region.

6. The system of claim 5 in which said second engaging means is a belt under tension and in contact with said driven elements, said tension varying means including movable snub rollers contacting said belt at positions intermediate adjacent inserts of said second zonal region.

7. The system of claim 6 in which said tension varying means further includes an expandable member operatively connected to both a source of fluid and to an external fluid vent, said expandable member lowering said snub rollers in response to said signals, thereby reducing the tension in said belt.

* * * * *